US007959736B2

(12) United States Patent
Cullinger

(10) Patent No.: US 7,959,736 B2
(45) Date of Patent: Jun. 14, 2011

(54) BIOMASS PROCESSOR

(75) Inventor: Trevor Essex Cullinger, Kirwan (AU)

(73) Assignee: Biomass Technologies Pty Ltd, Surry Hills (AU)

( * ) Notice: Subject to any disclaimer, the term of this patent is extended or adjusted under 35 U.S.C. 154(b) by 335 days.

(21) Appl. No.: 12/083,765

(22) PCT Filed: Oct. 19, 2006

(86) PCT No.: PCT/AU2006/001551

§ 371 (c)(1),
(2), (4) Date: Jun. 16, 2008

(87) PCT Pub. No.: WO2007/045035

PCT Pub. Date: Apr. 26, 2007

(65) Prior Publication Data

US 2009/0241944 A1 Oct. 1, 2009

(30) Foreign Application Priority Data

Oct. 20, 2005 (AU) ................................ 2005905818

(51) Int. Cl.
*B01J 3/00* (2006.01)

(52) U.S. Cl. ........................................................... 127/2

(58) Field of Classification Search ......................... None
See application file for complete search history.

(56) References Cited

U.S. PATENT DOCUMENTS 2,908,596 A 10/1959 Ruth
3,552,304 A 1/1971 French et al.
5,358,571 A 10/1994 Villavicencio et al.
6,372,086 B1 * 4/2002 Sieron et al. .................... 162/96
2001/0002037 A1 * 5/2001 Cullinger ............... 241/101.742
2004/0255934 A1 12/2004 Granguillhome et al.

FOREIGN PATENT DOCUMENTS

| | | | |
|---|---|---|---|
| AU | 747116 | | 10/1998 |
| AU | 2003255227 | | 6/2004 |
| FR | 2 350 400 | A1 | 12/1977 |
| GB | 660590 | | 11/1951 |
| GB | 710191 | | 6/1954 |
| GB | 984 164 | A | 2/1965 |
| WO | 01/45523 | A1 | 6/2001 |

OTHER PUBLICATIONS

Silin, P.M., (1964), *Technology of Beet-sugar Production and Refining*, Israel Program for Scientific Translations Ltd., p. 482, See Section II, "Juice extraction from beets" , pp. 88-178.
Extended European Search Report dated Mar. 30, 2010, for EP Application No. EP 06 80 4417, six pages.

* cited by examiner

*Primary Examiner* — Melvin C Mayes
*Assistant Examiner* — Stefanie Cohen
(74) *Attorney, Agent, or Firm* — The Nath Law Group; Jerald L. Meyer; Stanley N. Protigal

(57) ABSTRACT

A process (10) and apparatus (2) for extracting juice from a fibrous material. The process (10) comprises a step of feeding the fibrous material (13) into a receiving chamber (30) having a fluid contained therein. The fibrous material (13) is then combined with the fluid in the receiving chamber (30) to form a first fluid mixture. The first fluid mixture is then passed through at least one cell disruptor device (40) to facilitate at least partial release of juice from the fibrous material into the first fluid mixture, thereby forming a second fluid mixture having a relatively higher released juice content than said first fluid mixture with relatively finely disrupted fibrous material suspended therein. The second fluid mixture is then collected.

15 Claims, 7 Drawing Sheets

BIOMASS PROCESSOR

CROSS-REFERENCE TO RELATED APPLICATIONS

The present application claims priority from Australian Provisional Patent Application No 2005905818 filed on 20 Oct. 2005, the content of which is incorporated herein by reference.

FIELD OF THE INVENTION

The present application relates to a process and apparatus for extracting juice from harvested plant matter. In particular, the present application is directed to a process and apparatus for extracting juice from crops containing sugars, such as sucrose, fructose and/or glucose.

BACKGROUND OF THE INVENTION

Sugar cane is a tall growing monocotyledonous crop plant that is cultivated in the tropical and subtropical regions of the world primarily for its ability to store high concentrations of sucrose, or sugar, in the internodes of the stem. Sorghum is a close relative of sugarcane and like sugarcane, particular varieties of sorghum, known as "sweet sorghums", also accumulate large amounts of sugar in their stems. Near the time of grain maturity, sweet sorghums have 10 to 25% sugar in stalk juice, with sucrose being the predominant disaccharide.

The Australian sugar industry produces raw and refined sugar from sugarcane, with approximately 85% of raw sugar produced in Australia exported, the net income for Australia from sugar sales in 1999/2000 being approximately $1 billion (SRDC 2002).

Traditionally, sugar is initially extracted from the raw cane at sugarcane mills distributed throughout the growing region. Typically, the sugar cane grows for 10 to 18 months before harvest and mature sugar cane stands between two to four metres high and is ideally harvested when the sugar content is at its highest. In Australia and other technically advanced countries, sugar cane is harvested by a variety of mechanical harvesters, which cut the cane stalks off at their base, close to the ground, and feed the cane stalks through a variety of cutting implements to produce billets of cane which can be readily collected and transported to the mills for further processing.

The billets of cane are typically collected in bins and are hauled to the sugar cane mills by a variety of methods, such as diesel locomotives or the like. The cane is typically processed such that the cane harvested earliest is processed first to maintain a fresh cane supply to the mill. The cane is then typically shredded in a hammermill to shred the cane into fibrous material. In this regard, the cells in the cane stalk containing the sugar juice are ruptured but no juice is extracted at this stage.

The shredded cane is then typically fed through a series of crushing mills to extract the sugar rich juice from the fibrous material, and the juice is then pumped away for further processing. The left over fibrous material is called bagasse, which can be used as a fuel source for the mill. It has been found that the efficiency of juice extraction from such crushing or squeezing methods is quite low, and in some cases losses can be as high as 50%. This is typically due to the insufficient cell disruption of the fibrous material and in many instances, full release of the secondary plant substance, which is partly fixed to the cell structure of the fibrous material, is not possible with such traditional mechanical processes.

The juice is then typically heated under pressure in the presence of lime to facilitate precipitation of impurities, such as soil etc present therein, which are removed in a clarifier in which such impurities settle at the bottom thereof as mud. In this regard, the clear or clarified juice is drawn from the top of the clarifier and concentrated to syrup by boiling off the excess water in an evaporator station. The syrup is then made to go through multiple rounds of crystallisation to extract the sucrose after which the product is boiled and the sucrose separates from the remaining molasses fraction. The raw sugar is then cooled and dried and shipped in bulk to sugar refineries worldwide for further purification, resulting in a high quality purified product.

With the traditional systems of harvesting and processing the sugar cane into its various by-products, the sugar cane crop is typically fully harvested and removed from the field resulting in a loss of biomass which must be compensated for by the application of fertilizers and the like to the fields to maintain crop production levels. All the fibre generated during the production process is typically retained at the mill where it is used as fuel to generate electricity for the mill or sold as stockfeed or fertiliser whereby little benefit is gained by the original producer of the cane.

Further, as the sugar cane in the form of billets is transported over significant distances to the mill by a variety of transport methods, transport and handling costs are typically high. As the billets account for a significant volume of raw material, relatively large vehicles are required to transport the cane, creating a further burden on local and governmental infrastructure to support such transport vehicles.

Equally, the milling procedure generates a variety of useful by-products, other than raw sugar. These by-products include ethanol, which can be produced from fermented molasses and used as a fuel, or a cleaning product or in perfumes and bricks; molasses, the final syrup product which can be used as stock feed for cattle as well as a raw material for the production of alcohol and carbon dioxide; and mud and ash, which is the residue left after filtering which can be used as soil conditioners and fertilizers. As the cane grower does not directly have access to these by-products as they only become available through the milling procedure, it is difficult for the grower to market and trade in these goods to provide additional diversification opportunities.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect, the present invention is a process for extracting juice from a fibrous material, the process comprising:

feeding said fibrous material into a receiving chamber having a fluid contained therein;

combining said fibrous material and said fluid in said receiving chamber to form a first fluid mixture;

passing at least some of said first fluid mixture through at least one cell disruptor device to facilitate at least partial release of juice from the fibrous material into said first fluid mixture, thereby forming a second fluid mixture having a relatively higher released juice content than said first fluid mixture with relatively finely disrupted fibrous material suspended therein; and collecting at least a portion of said second fluid mixture.

In an embodiment of this aspect of the invention, the step of feeding the fibrous material into the receiving chamber comprises delivering raw fibrous material into the receiving chamber. The raw fibrous material can be in the form of harvested plant matter, such as harvested stalks of sugar-containing plant matter, or can be in the form of billets or sections of such plant matter which have been passed through a cutting device prior to feeding into the receiving chamber. In one form, the fibrous material can be continuously and directly fed into the receiving chamber as it is harvested from a field. In another form, the fibrous material can be harvested from the field and fed into the receiving chamber in separate actions, for example, in a batch process.

The fibrous material can be passed through a cell exposing device prior to being fed into the receiving chamber to at least partially expose and rupture the juice-containing cells of the material. The cell exposing device can be a shredding device which in turn can be a device employing rotating hammers or discs that shred and/or shear the fibrous material as it is being fed into the receiving chamber.

In one embodiment, upon the commencement of the process, a quantity of the fluid is initially supplied to the receiving chamber to receive the fibrous material. The initial supply of fluid may be in the form of water, such as distilled and/or purified water. The fluid can also be supplied during the step of feeding the fibrous material to the receiving chamber.

In another embodiment, the step of combining the fibrous material and the fluid to form the first fluid mixture comprises employing cutting devices that extend into the receiving chamber. The cutting devices can be in the form of rotary blade cutters. The cutting devices may contact the fibrous material to cut and shear the fibrous material suspended in said fluid, thereby releasing an initial portion of juice from the juice containing cells into the surrounding fluid. In this regard, the fibrous material fed into said receiving chamber is initially reduced in size, such that the first fluid mixture is a blend of fibrous material in a fluid state.

The fluid state of the first fluid mixture may be monitored by a monitoring device to ensure that the fluid state is maintained at a desired level to facilitate a level of fluid flow of the first fluid mixture. The monitoring device may be a fluid flow sensor provided in the receiving chamber which detects the flow rate of the fluid. In this regard, the fluid state of the first fluid mixture may be maintained below a level of between 10-20% of fibre content. In one form, it may be desirable to maintain the level of fibre content present in the first fluid mixture below a level of around 15%.

In one embodiment, in the event of the fibre content present in the first fluid mixture exceeding the desired level, the fibrous material may be removed from the first fluid mixture. An extractor device may be provided which physically collects some or all of the fibrous material from the first fluid mixture and processes the material to remove juice therefrom. While the extractor device can dispose of the remaining fibrous material, in another embodiment, at least some of the fibrous material can be returned to the first fluid mixture. In this regard, the juice removed from the extracted fibrous material may be returned to said first fluid mixture.

In one embodiment, the at least one cell disruptor device facilitates a release of a majority of the juice from the fibrous material. Still further, the at least one cell disruptor device can facilitate a release of all of the juice from the fibrous material. In another embodiment, the at least one, cell disruptor device facilitates at least partial release of juice from at least some of the juice-containing cells in the fibrous material, more preferably, a majority of such cells, and still more preferably, all of the cells. In one embodiment, at least some, more preferably the majority, and most preferably substantially all or all of the fibrous material fed to the at least one cell disruptor device can have a length less than a predetermined length. As an example only, the predetermined length can be about 3 cm, more preferably about 2.5 cm, yet more preferably about 2 cm and even more preferably about 1 cm.

In yet another embodiment, the step of passing at least some or all of the first fluid mixture through at least one cell disrupter device comprises delivering the first fluid mixture to an inlet of the cell disruptor device. The first fluid mixture may be delivered by a pump or by gravity to the inlet of the cell disrupter device. In this regard, the cell disruptor device may be a mechanical cell disruptor device such as a rotor-stator homogeniser. The cell disruptor device may function as a pump and draw the first fluid mixture through said inlet and generate a turbulence in the flow of the first fluid mixture as it passes out an outlet of said cell disrupter device. The turbulence in the flow of the first fluid mixture as it passes through the cell disruptor device causes the fibrous material present in the mixture to experience relatively high shearing forces thereby causing the cellular structure of the fibrous material to at least partially of fully disintegrate and release juice therefrom.

In one embodiment, the first fluid mixture may pass through the cell disrupter device only once to form said second fluid mixture. In this regard, the first fluid mixture is supplied to the inlet of the cell disruptor device, and the second fluid mixture is effectively formed at the outlet of the device. In another embodiment, a plurality of cell disrupter devices may be arranged in series to process the first fluid mixture in two or more stages. In this arrangement, some or each of the cell disrupter devices may have different capacities relative to the other devices, to tolerate differing particle sizes of the fibrous material. In yet another embodiment, the first fluid mixture may pass through a single cell disruptor device a plurality of times to form the second fluid mixture.

In one embodiment, a majority of the second fluid mixture is collected. In another embodiment all of the second fluid mixture is collected. In this regard, the second fluid mixture may be collected upon exiting the at least one cell disrupter device. In this regard, the second fluid mixture may be delivered to a holding chamber. A pump may be employed to deliver the second fluid mixture to the holding chamber. The second fluid mixture can then be transported to a remote site for further processing if desired. The holding chamber may be in fluid communication with the receiving chamber to allow the second fluid mixture to be reintroduced back into the receiving chamber in the event of the fibre content present in the first fluid mixture exceeding the desired level.

According to yet another embodiment, the process may comprise a further step of separating at least some or all of the juice from the fibrous material present in the second fluid mixture. In this regard, the captured second fluid mixture may be delivered to a separating device. In one embodiment, the separating device may be a centrifuge decanter which separates the juice from the fibrous material by applying a centrifugal force to the second fluid mixture. The separated juice may then be extracted from the separating device. In a further embodiment, the fibrous material separated from the second fluid mixture by said at least one cell disruptor device and/or in the further separating device can be returned to the first fluid mixture or the second fluid mixture or to the intake of the separating device.

The process may be performed in a mobile or non-mobile unit which is located within a field or crop to receive the fibrous material as it is harvested from the crop. In another form, the one or more of steps of the process may be performed at separate locations and/or at remote locations to the field or crop.

According to a second aspect, the present invention is an apparatus for extracting juice from a fibrous material comprising:

a receptacle for receiving said fibrous material;

a processor for processing said fibrous material received by said receptacle into a first fluid mixture;

at least one cell disruptor device for receiving at least some of said first fluid mixture and facilitating at least partial release of said juice from the juice containing cells to form a second fluid mixture; and a storage chamber for receiving and storing at least a portion of the second fluid mixture.

In an embodiment of this aspect of the invention, the receptacle may be a tank that can have a quantity of fluid contained therein prior to receiving the fibrous material. The quantity of fluid may be water, such as distilled or purified water, or previously extracted juice, or a combination of previously extracted juice and water, such as distilled and/or purified water. In this regard, the fibrous material is received into said fluid contained within the receptacle.

In one embodiment, the received fibrous material may be in the form of harvested plant matter, such as harvested stalks of sugar-containing plant matter. In another embodiment, the fibrous material may be in the form of diced or billeted sections of plant matter which have been passed through a cutting device prior to being received in the receptacle.

The fibrous material can be processed prior to being received in the receptacle, by a cell exposing device, to at least partially expose and rupture the juice-containing cells of the material. The cell exposing device can be a shredding device which in turn can be a device employing rotating hammers or discs that shred and/or shear the fibrous material as it is being fed into the receiving chamber.

In another embodiment, the processor comprises one or more cutting devices that extend into the receptacle. The cutting devices can be in the form of rotary blade cutters. The cutting devices may contact the fibrous material to cut and shear the fibrous material suspended in said fluid, thereby releasing an initial portion of juice from the juice containing cells into the surrounding fluid. In this regard, the fibrous material present in the receptacle is initially reduced in size, such that the first fluid mixture is a blend of fibrous material in a fluid state.

The fluid state of the first fluid mixture may be monitored by a monitoring device to ensure that the fluid state is maintained at a desired level to facilitate a level of fluid flow of the first fluid mixture. The monitoring device may be a fluid flow sensor provided in the receptacle which detects the flow rate of the fluid. In this regard, the fluid state of the first fluid mixture may be maintained below a level of between 10-20% of fibre content. In one form, it may be desirable to maintain the level of fibre content present in the first fluid mixture below a level of around 15%.

In one embodiment, in the event of the fibre content present in the first fluid mixture exceeding the desired level, the fibrous material may be removed from the first fluid mixture. An extractor device may be provided which physically collects the fibrous material from the first fluid mixture and processes the material to remove juice therefrom and to dispose of the remaining fibrous material. In this regard, the juice removed from the extracted fibrous material may be returned to said first fluid mixture.

In yet another embodiment, the at least one cell disruptor device facilitates a release of a majority of the juice from the fibrous material. Still further, the at least one cell disruptor device can facilitate a release of all of the juice from the fibrous material. In another embodiment, the at least one cell disruptor device facilitates at least partial release of juice from at least some of the juice-containing cells in the fibrous material, more preferably, a majority of such cells, and still more preferably, all of the cells. In one embodiment of this aspect, at least some, more preferably the majority, and most preferably substantially all or all of the fibrous material fed to the at least one cell disruptor device can have a length less than a predetermined length. For example, the predetermined length can be about 3 cm, more preferably about 2.5 cm, yet more preferably about 2 cm and even more preferably about 1 cm.

In yet another embodiment, at least some or all of the first fluid mixture is received at an inlet of the cell disruptor device. The first fluid mixture may be delivered by a pump or by gravity to the inlet of the cell disruptor device. In this regard, the cell disrupter device may be a mechanical cell disruptor device such as a rotor-stator homogeniser. The cell disruptor device may function as a pump and draw the first fluid mixture through said inlet and generate a turbulence in the flow of the first fluid mixture as it passes out an outlet of said cell disruptor device. The turbulence in the flow of the first fluid mixture as it passes through the cell disruptor device causes the fibrous material present in the mixture to experience relatively high shearing forces thereby causing the cellular structure of the fibrous material to at least partially or fully disintegrate and release juice therefrom.

In a further embodiment, the first fluid mixture may be received by the cell disrupter device only once to form said second fluid mixture. In this regard, the first fluid mixture is supplied to the inlet of the cell disruptor device, and the second fluid mixture is effectively formed at an outlet of the device. In another embodiment, a plurality of cell disruptor devices may be arranged in series to process the first fluid mixture in two or more stages. In this arrangement, some or each of the cell disruptor devices may have different capacities relative to the other devices, to tolerate differing particle sizes of the fibrous material. In yet another embodiment, the first fluid mixture may pass through a single cell disruptor device a plurality of times to form the second fluid mixture.

In yet another embodiment, the storage chamber receives and stores a majority of the second fluid mixture. In another embodiment all of the second fluid mixture is received and collected in the storage chamber. In this regard, the second fluid mixture may be collected upon exiting the at least one cell disrupter device. A pump may be employed to deliver the second fluid mixture to the storage chamber. The second fluid mixture can then be transported to a remote site for further processing if desired. The storage chamber may be in fluid communication with the receptacle to allow the second fluid mixture to be reintroduced back into the receptacle in the event of the fibre content present in the first fluid mixture exceeding the desired level.

The apparatus may further comprise a separator device for separating the juice from the fibrous material present in the second fluid mixture. In this regard, the second fluid mixture may be delivered to the separator device from the storage chamber. In one embodiment, the separator device may be a centrifuge decanter which separates the juice from the solid fibrous material by applying a centrifugal force to the second fluid mixture. The separated juice may then be extracted from the separator device. In a further embodiment, the fibrous material separated from the second fluid mixture by said at least one cell disruptor device and/or by the separator device can be returned to the first fluid mixture or the second fluid mixture or to the intake of the separating device.

In still a further embodiment, the apparatus may form part of a mobile unit which is positioned within the field or crop to receive the fibrous material as it is harvested. In another form, the apparatus may be located remote from the crop or field such that the fibrous material harvested in the crop or field is delivered to the apparatus for juice extraction.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

By way of example only, the invention is now described with reference to the accompanying drawings.

DETAILED DESCRIPTION OF AN EXEMPLARY EMBODIMENT OF THE INVENTION

Whilst the present invention will be described in relation to the processing of sugar cane into sugar containing juice, it will be appreciated that the present invention could be employed in relation to all crops containing sugars, such as sucrose, fructose and/or sucrose.

Figure 1:
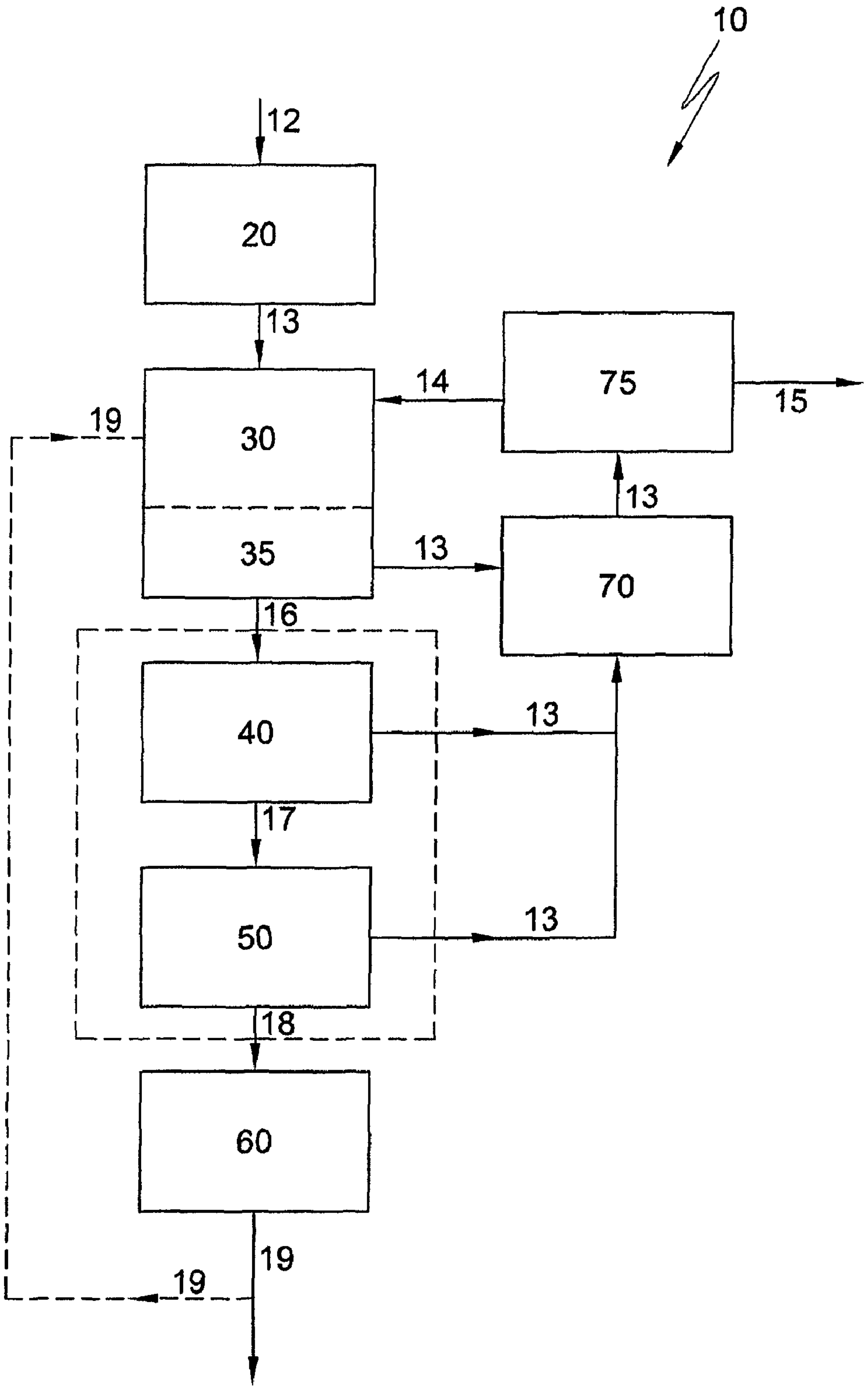
FIG. 1 is a flow diagram depicting a juice extraction process according to one embodiment of the present invention.

An embodiment of the general process 10 for extracting sugar containing juice from the sugar cane is shown in FIG. 1. The process will be described in relation to a biomass processing unit 2 such as that shown in FIG. 2, however it will be appreciated that the process, or various steps within the process, could be performed remotely from the processing unit 2 as needs arise.

As shown in FIG. 1, prior to under going the shredding stage 20, the raw fibre is cut into sections, known as billets 12, which are typically 20-30 cm in length. There are a variety of harvesting devices for performing this function, and most devices generally comprise a vehicle which travels along the rows of the crop and has a forward extending boom carrying a driven rotary pre-topper which may be vertically adjusted for severing the tops of the plant as the harvesting vehicle advances. A base cutter is typically provided to cut the plant at or near ground level and the stalks are pushed over forwardly, away from the harvesting device, such that they may each be conveyed butt-end first, through the harvester by a train of feed rollers which continuously feed the stalks to a rotary chopping cutter, which chops them into billets.

The present invention may also be able to receive the raw fibre by constant feeding and as such may receive the stalks without necessarily requiring the stalks to be cut into billets 12. In this regard, the cane stalks are broken down by the shredder or a forage header arrangement for further processing.

The shredding stage 20 shreds the billets 12 into fibrous material 13 such that the juice containing cells in the fibrous material 13 are at least partially exposed and ruptured without any relatively significant amount of juice being extracted. There are a variety of devices for performing the shredding stage, such as rotating hammer devices or rotating discs which shear the billets 12 into fibre thereby rupturing the juice containing cells. As mentioned above, the plant matter may also be presented in the form of non-billeted stalks, or a forage header or similar cutting device could be employed as the initial harvesting device resulting in the stalks being initially broken down to the fibrous material 13, reducing or eliminating the need to use a shredder or like process to further break the whole stalk into sizes suitable for the holding tank 30. One particular device for performing this function will be described in relation to the processing unit 2 below.

Following the shredding stage 20, the resultant fibrous material 13 is captured in a holding tank 30, thereby creating an intermediate collection of fibrous material 13 for extracting juice therefrom. The holding tank 30 can be, as is depicted, situated directly below the shredder device 20, such that only pre-shredded plant matter is received into the holding tank 30, which has a relatively large capacity suitable to receive a continuous supply of fibrous material 13.

A plurality of cutters 35 are provided in the holding tank 30 to further reduce the fibrous material 13 and to begin the extraction of juice therefrom. The cutters 35 are typically in the form of rotary blade cutters, such as industrial food processing machines, which extend into the holding tank 30 to be in contact with the fibrous material 13 contained therein. The blades on the cutters 35 cut and shear the fibre, and preferably agitate the entire mixture so allowing for the release of the juice from the ruptured juice-containing cells, to create a relatively more fluid mix of fibrous material 13 and juice. As well as cutting and shearing the fibrous material 13 into a relatively finer blend of fibrous material 13 and juice, the cutters 35 also ensure that the fluid mass present in the holding tank 30 is kept moving, thereby ensuring that the more coarse fibrous material 13 is coming into continual contact with the blades of the cutters 35 to expose and rupture the juice containing cells.

To ensure that the system retains a certain degree of fluidity, it is desirable that the fibre content in the holding tank 30 is maintained at or below a desired maximum level. Based upon knowledge and understanding of existing sugar containing fibres, it is anticipated that the maximum desired fibre content may vary between 5-20% depending upon the type of fibre being processed. For illustrative purposes, the present process will be described as having a maximum fibre content of around 15%. Therefore, at the commencement of the process, the holding tank 30 may be supplied with purified water to ensure that the initial delivery of fibrous material occurs into a fluid environment. This serves to maximise the efficiency of the process and the role of the cutters 35.

If, during the process, the fibre content present in the holding tank 30 becomes too great and exceeds the desired maximum level (for example, a level of around 15%), excess fibre 13 can be removed from the holding tank 30 via an extractor 70. The extractor 70 may be a screw-type extractor or a perforated extraction plate in communication with the holding tank 30. The entry point into the extractor 70 is at a point above the base of the holding tank 30 such that any fibre will be taken from the fluid mass present within the holding tank 30 and extracted out of the tank 30.

By initiation of the extractor 70, the fibre 13 is delivered to an extraction device 75, such as a belt press, hammer, roller, screw press, centrifugal separator or any other mechanical juice extractor device which extracts any juice 14 present in the fibre 13. The juice 14 can then be delivered back to the tank 30. The fibre 15 remaining after the juice extracted by the extraction device 75, can be removed from the process and stored for further processing, returned to the field as biomass, returned to the tank 30 if required, and/or even delivered to one or both of the cell disruptors 40,50 and/or the separating device 60 (all described in more detail below).

The liquid mass 16, present in the holding tank 30 can be drawn from the tank 30, when appropriate, either continuously or in batches, and delivered to a first-stage cell disruptor 40. The cell disruptor 40 can take a variety of forms so long as it acts upon any fibres present in the liquid mass 16 to break-up their cellular structure and release the juice therefrom. The first-stage cell disruptor 40 may take a variety of forms, such as a rotor-stator homogeniser, a bead mill homogeniser, a blade homogeniser, a freeze fracturing device, a grinder, a pestle and tube homogeniser, an ultrasonic disintegrator or a similar device to any one of these that can target the specific cells of the fibre to release the juice therefrom. It will be appreciated that the liquid mass 16 received by the first-stage cell disruptor 40 is likely to contain a relatively significant amount of fibre with the juice containing-cells at least partially exposed and ruptured due to the action of the shredder 20 and the cutters 35 acting upon the fibre being stored within the holding tank 30.

The liquid mass 16 is typically drawn from an appropriate location above the base of the tank 30 and fed directly into the first-stage cell disruptor 40. A pump or gravity feed arrangement may be employed to draw the liquid mass 16 to the disruptor 40, and in some instances the disrupter 40 may abut directly onto the holding tank 30 to receive the liquid mass 16. The cell disruptor 40 is adapted to generate a turbulence in the flow of the liquid mass 16 passing therethrough, causing the solid fibre particles to break down further and release juice as they overlap and disintegrate due to shearing forces generated between the fibre particles and the body of the disruptor 40. In this regard, the first-stage cell disruptor 40 processes the liquid mass 16 into a more homogeneous fluid 17 having a higher released juice content and more finely sheared fibre particles.

In this depicted embodiment, and if operating conditions require it, substantially all or all of the fibrous material fed to the cell disrupter device 40 can have a length less than a predetermined length. It will be appreciated that this need not necessarily be the case.

Should the fibre content present in the first-stage cell disruptor 40 become too great, thereby having the potential to prevent further fluid flow, at least a portion of the excess fibre 13 can be drawn from the disruptor 40 to the extractor 70 where it can then be removed from the system in the manner as discussed above.

The relatively more homogenous fluid 17 can be supplied to a common rail which is in fluid communication with a second-stage cell disruptor 50. The first stage cell disruptor 40 may supply the fluid 17 under pressure to the common rail or a pump may be employed to supply the fluid 17. The second-stage cell disruptor 50 may also be a rotor-stator homogeniser that acts in a similar manner to the first stage rotor-stator homogeniser discussed above, however the second-stage cell disruptor typically has a relatively lower tolerance to deal with coarse fibres than is the case with the first-stage cell disruptor 40. Therefore, as the homogenous fluid 17 which flows from the first-stage cell disruptor 40 contains more finely sheared fibre particles, the second-stage cell disruptor is able to further process these particles to extract juice from them and to generate a fluid 18 having a relatively higher released juice content and considerably smaller fibre particle size than that present in the supplied fluid 17.

As shown in FIG. 1, in the event that the fibre content present in the second-stage cell disruptor 50 becomes such to prevent proper operation of the cell disruptor 50, excess fibre 13 can be drawn, by a pump or the like, from the cell disrupter 50 to the extractor 70 for discharge from the system or delivery to other stages in the device, including the holding tank 30 and/or the inlet of one or both of the cell disruptors 40,50 and/or the separating device 60.

Whilst the treatment and breaking down of the liquid mass 16 present in the tank 30 has been described as a two-stage process, it will be envisaged that this process could be performed in a single step, as shown by the dashed line encompassing the two blocks 40 and 50, depending upon the requirements of the system. In any regard, the fluid could be continuously recirculated back into the system to increase the fluid content of the liquid mass at another location in the apparatus to ensure that the fluid passing through the system has sufficient fluidity to enable high-shear forces to be generated in the fluid to break down the fibre particles and release the juice from the fibre.

The fluid 18 which is generated at the end of the homogenisation process provided by the cell disruptors 40,50 is relatively very high in released juice content and has relatively very fine fibre particles contained therein and as such is relatively easily transportable via pipes or the like. In this regard, the fluid 18 could be readily taken from the process 10 and transported to a second site for further processing, to remove some or all of the relatively fine fibre particles present therein.

In order to remove the relatively fine fibre particles and to isolate the juice from the fibre particles, the fluid 18 may be further presented to a separating device 60. The separating device 60 may be a decanter, such as a centrifuge decanter, having a central rotating screw positioned therein to separate the solid fibre particles from the juice through centrifugal force. The specific operation of the decanter will be described in more detail below in relation to the actual processing mechanism. In any regard, the juice product 19 can be readily extracted from the decanter and collected for distribution as necessary. Similarly, some or all of the juice 19 can be reintroduced back into the tank 30 to ensure that the fluid content in the system is retained at a desirable level to facilitate the process. In this regard, it may be necessary to continually source the processed juice, and/or water, back into the process where necessary.

It will be appreciated that the process as described above extracts the juice from the fibre without necessarily requiring squeezing or rolling which is an inefficient method of disrupting the juice containing cells of the fibre. Rather, the present process relies upon creating a fluid mass of fibre and juice that can be continually processed by applying various shearing forces to the fluid to cause cell disruption in the fibre particles to reduce the fibre and release the juice therefrom. Such a process can be performed in the field thereby reducing the need to transport billets of plant material to a mill in a series of trucks or locomotives, as a tanker can be readily used which can be filled with the juice 19, which is fluid and has a much smaller volume than the billets. The transportation of the juice 19 around and/or from the field to a mill or processing plant can be undertaken by a pipeline if so desired.

An embodiment of a biomass processing unit 2 for performing the process as described above, will now be described in relation to FIGS. 2 to 7. It will be appreciated that whilst the unit 2 will be described incorporating equipment to undertake each of the steps of the process 10 as discussed above, the unit 2 could be configured to only perform one or more of the steps, with the other of the steps being performed on one or more other sites.

The depicted unit 2 is in some ways generally in the form of a traditional crop harvester which is employed in the field to harvest the individual stalks of a sugar containing crop, such as sugar cane. As is shown, the unit 2 employs a driven rotary pre-topper 3 for severing the tops of the cane as the unit 2 advances, as well as a base cutter 4 and lifter arrangement 5 for cutting the cane and lifting it into the unit 2 for further processing. It will be appreciated, that whilst the present invention has been described in relation to pre-topped cane stalks, it can equally be employed in a manner such that it harvests un-topped stalks of cane or sweet sorghum.

Figure 3:
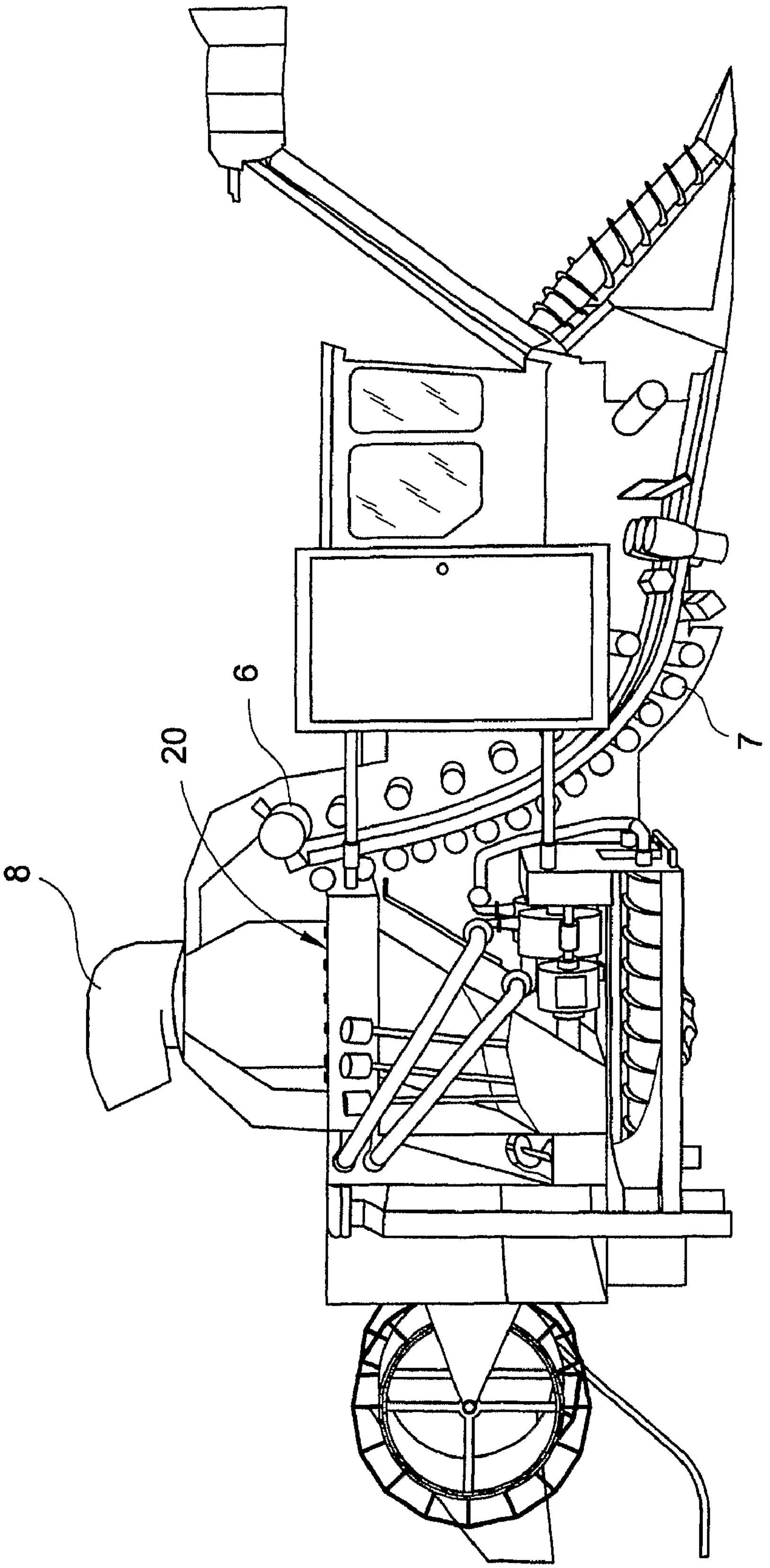
FIG. 3 is a partial cross-sectional view of the biomass processing unit of FIG. 2.

As shown more clearly in the cross-sectional view of the unit 2 in FIG. 3, a conveyor system 7 is provided for transporting the stalks of cane to the shredder 20. A rotary cutter 6 is provided to section the cane stalk into billets prior to the cane entering the shredder 20. An extractor fan or blower 8 is provided proximal to the shredder 20 to at least partially remove chaff, dust and other particulate matter prior to entering the shredder 20 during operation thereof, and to deliver such material back to the field.

Figure 4:
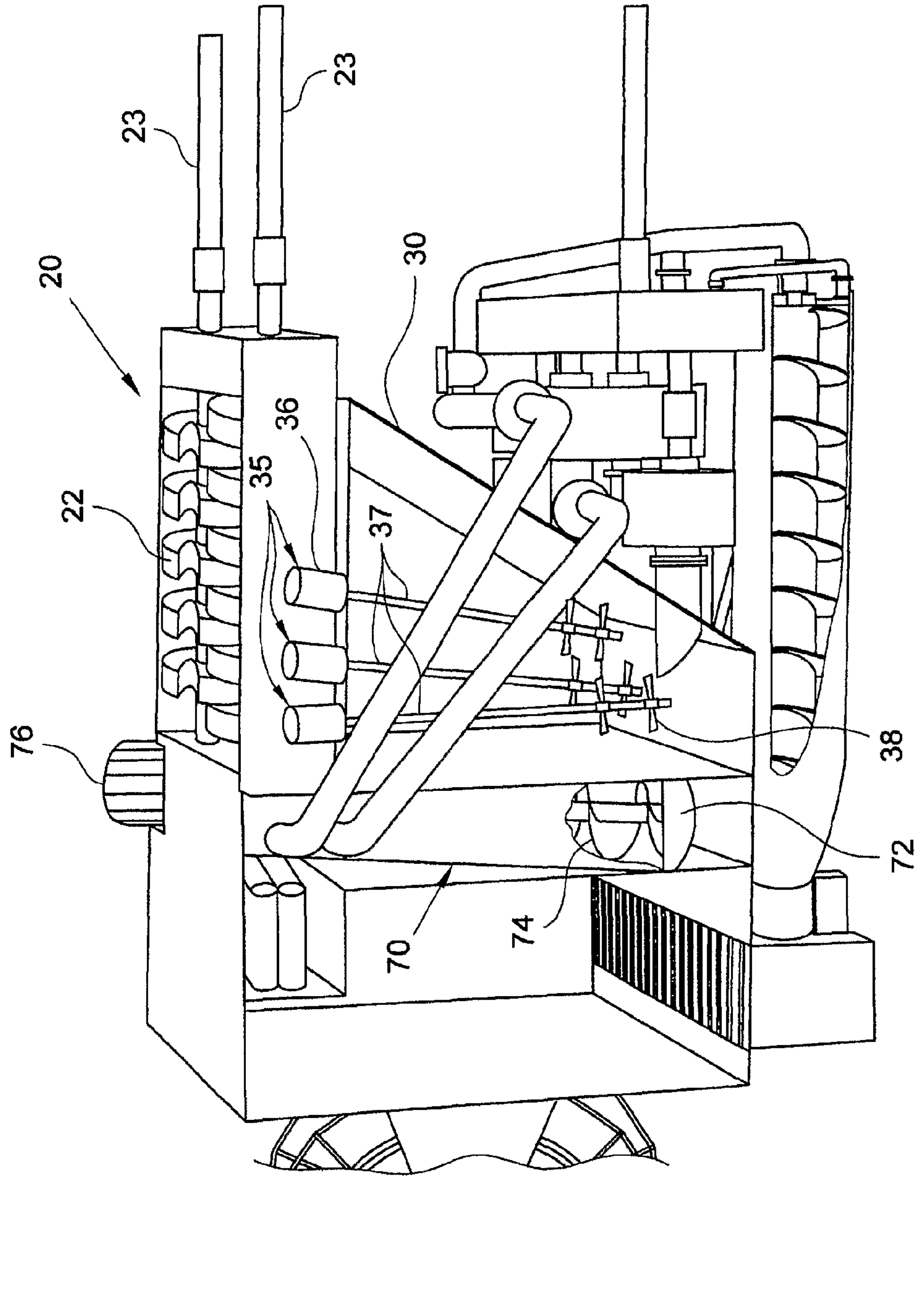
FIG. 4 depicts an isolated view of the juice extraction system of the biomass processing unit of FIG. 2.
Figure 5:
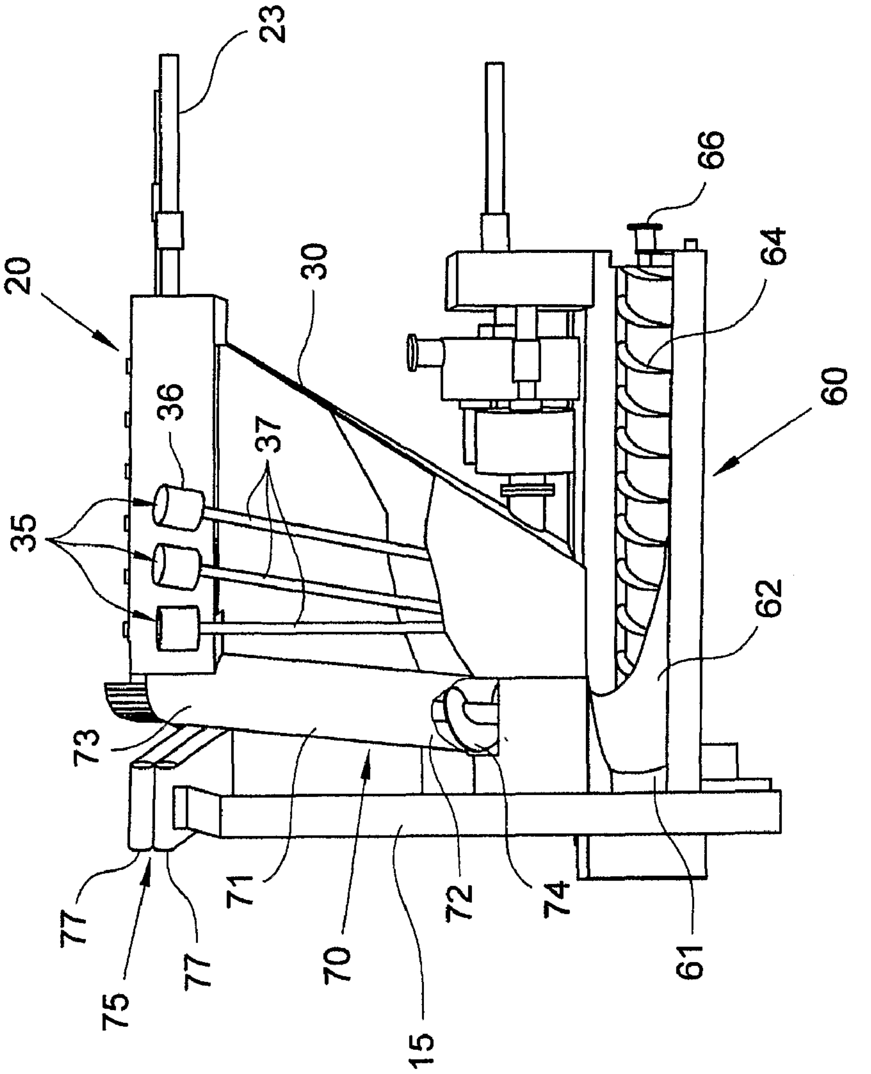
FIG. 5 depicts a simplified plan view of the juice extraction system of FIG. 4 with some components removed for clarity.

FIG. 4 shows in more detail the juice extraction system of the present invention. The depicted shredder 20 is in the form of a series of rotating discs 22 mounted upon two central shafts 23 which are caused to rotate in opposing directions. In this regard, each of the discs 22 are provided with cut-out portions which enable the discs to grip the billets and shear the fibre thereof into smaller portions which are able to pass through the shredder 20 into the holding tank 30.

It will be appreciated that the manner in which the raw fibre is harvested and provided to the holding tank 30 is not essential to the working of the present invention. Similarly, the purpose of the shredder 20 merely ensures that the fibre is presented to the holding tank 30 in a manageable size and form, such that the juice containing cells are ruptured and exposed, to facilitate the juice extraction process of the present invention. In this regard, a variety of harvesting means could be employed, such as a forage harvester or the like, to present the raw fibre to the holding tank 30.

As shown, the holding tank 30 is located directly beneath the shredder 20 to collect the sheared fibre material of the cane billets as they pass through the shredder 20. A plurality of cutters 35 are shown extending into the tank 30 and comprise a driving unit 36, a drive shaft 37 and a series of blades 38 arranged at the end of the drive shaft 37. The cutters 35 are arranged such that the blades 38 extend into the fibre material present in the tank 30 to ensure that the fibre material present in the tank is cut and processed into a relatively finer blend of fibrous material and juice. This is achieved by the blades 38 acting against the fibrous material to shear the material and continually expose and present the juice containing cells to extract the juice content therefrom. The cutters 35 also perform an agitation function ensuring that the fluid mass present in the tank 30 is in a continual state of motion and fluidity so as to cause cell disruptive/disintegration fluid flow.

It will be appreciated that the fluid mass present in the holding tank 30 will be maintained in a substantially fluid state, with the maximum amount of fibre content being consistent with processing flow objectives, at, for example, around 15%. In this regard, upon commencement of the process it may be necessary to supply purified water to the holding tank 30 such that the initial delivery of fibrous material will be received into a fluid bath enabling processing of the fibrous material to commence upon collection of the fibrous material. Similarly, by continually monitoring the fluid state of the holding tank 30, it may be deemed necessary to recirculate the extracted juice or introduce water back into the holding tank at regular intervals to maintain the desired state of fluidity. The fluid state of the fluid mass present in the holding tank 30 may be monitored visually, for example, by an operator, to assess whether the flow of fluid is sufficient to be transported about the unit 2. It is also envisaged that a flow rate sensor or the like could be provided in the holding tank 30, or in pipes leading from the holding tank 30, to determine and measure the fluid state of the fluid mass.

In this regard, in the event of an excessive amount of fibre content, a screw extractor 70 may be provided which extends angularly along the wall of the tank 30. The screw extractor is more clearly shown in FIG. 5 and comprises a solid, or perforated cylindrical chamber 71 which is in fluid communication with the tank 30 at its lower end 72 and with a belt press 75 at its upper end 73. A screw feeder 74 is provided in the central bore of the chamber 71 and is operable by a motor 76 to rotate the screw 74 in a desired rotational direction.

The screw extractor 70 can be operated to ensure that the fluidity of the system is maintained within set limits by removing fibre from the system when the fibre content present in the fluid mass of the tank 30 exceeds a specific level, for example 15% of the fluid mass. In order to remove fibre from the system, the fibre is delivered to the bore of the chamber 71 whereby the screw 74 is initiated to draw the fibre up and away from the tank 30 along the chamber 71.

At the upper end 73 of the chamber 71, the fibre is delivered to the belt press 75. The belt press 75 comprises a pair of belt driven rollers 77 arranged in contact with each other, which transport and squeeze the fibre to remove any juice therefrom. Any extracted juice is, in the depicted embodiment, returned to the tank 30 via the chamber 71 which is in communication with the tank 30 at its lower end 72, to further contribute to the fluid mass retained therein. After the fibre has passed through the belt press 75, it continues to pass from the unit 2 under action of the rollers 77 in the form of highly ruptured/disintegrated raw cane/sweet sorghum fibre 15. This fibre 15 is returned to the field where it aids in returning the nutrients back to the soil for further plantations, or may be collected and used in other environmentally beneficial processes, for example, ethanol production. While not depicted, the processing unit 2 could be constructed to return fibre 15 to the holding tank 30 and/or even deliver it to the inlets of one or both of the cell disruptors 40,50 and/or the separating device 60.

It will be appreciated that the extractor 70 is only required to remove excess fibre content from the system and as such, should the fibre content be retained within acceptable levels, there will be no need to necessarily initiate the extractor 70.

Figure 6:
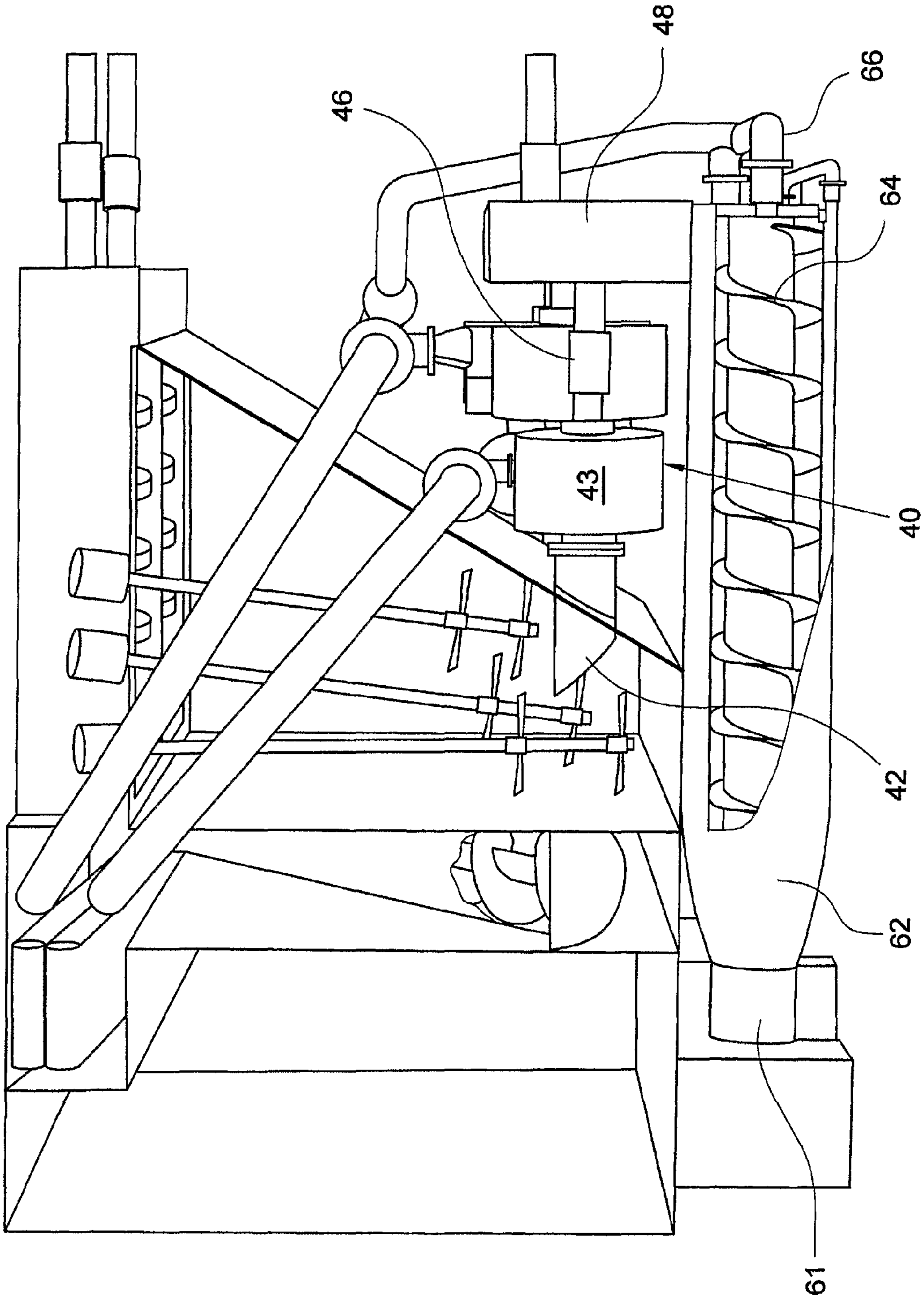
FIG. 6 is an enlarged view of the juice extraction system of FIG. 5 showing the manner in which the first and second stage cell disruptors communicate with the extractor unit.

As shown more clearly in FIG. 6, the liquid mass (juice and fibre mixture) present in the holding tank 30 is drawn from the tank into the first-stage cell disrupter 40 by pipe 42. The pipe 42 extends into the tank 30 at an appropriate location above the bottom of the tank and is relatively short to enable the fluid mass, which is of relatively high fibre content and fibre particle size, to flow to the cell disrupter 40.

The first-stage cell disruptor 40 is in the form of an homogenising device having a cylindrical housing 43 which houses an elliptical disc mounted diagonally to a rotating shaft, which causes the fluid mass to undergo a diagonal flow in axial and radial directions. This flow path, and the overlapping movements of the fluid mass within the housing 43 creates shearing forces between the fibres and the housing 43 thereby acting to break down the particle size of the fibres and in turn release the juice from juice containing cells of the fibre. The resulting fluid is then fed to a common fluid rail 48 via pipe 46.

The first-stage cell disrupter 40 may be a GORATOR® which is supplied and sold by hoelschertechnic-gorator GmbH & Co. KG.

In the event that the fibre content within the first-stage cell disruptor 40 is too great thereby restricting the desired fluid flow, excess fibre can be removed from the housing 43 and transported to the screw extractor 70 for removal or even return to a stage in the processing unit 2 in the manner as discussed above.

In this regard, the fluid present in the rail 48 has a relatively considerably higher juice content than that of the fluid mass received by the cell disruptor 40 and contains much finer fibre particles. This fluid can then be further processed by a second-stage cell disruptor to further break down the fibre particles and extract the remaining juice from the fibre particles. As is shown in FIG. 7, the unit 2 may employ two first-stage cell disruptors 40 and two second-stage cell disruptors 50 to ensure that the demand is met by the processor.

Figure 7:
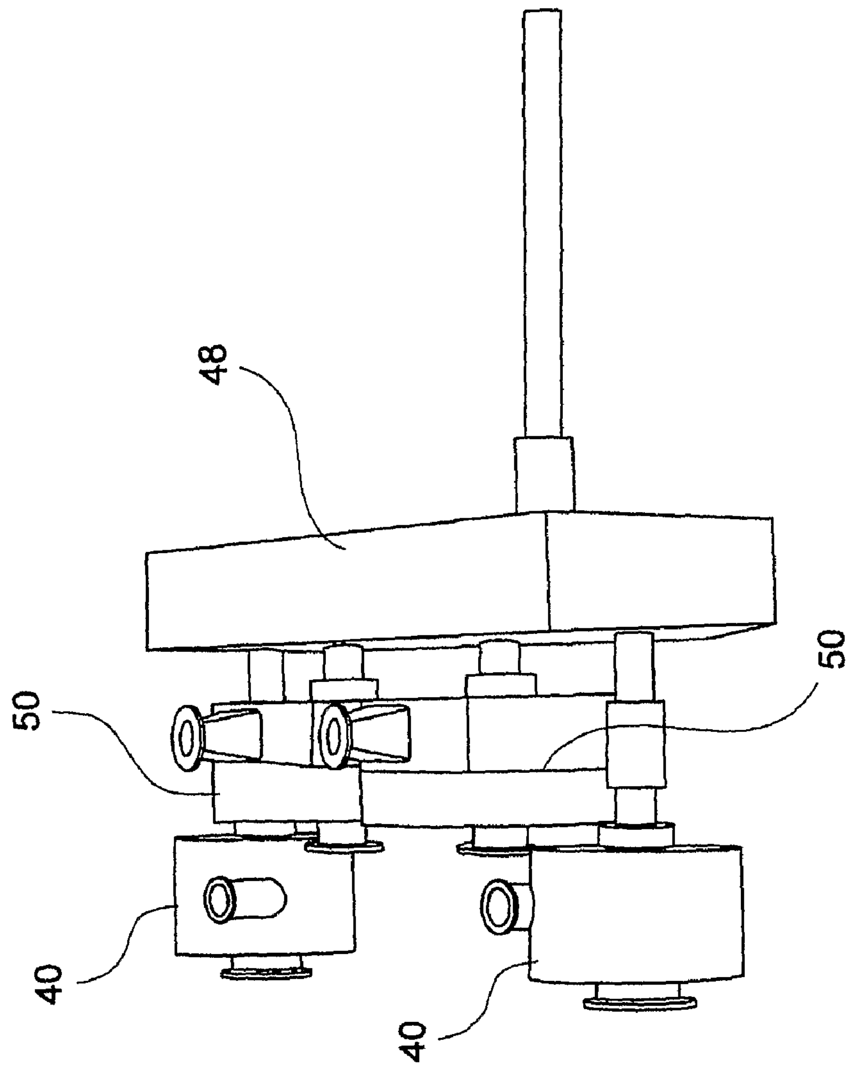
FIG. 7 is a perspective view of the configuration of the first and second stage cell disruptors showing the manner in which the cell disruptors communicate with the common fluid rail.

In such an arrangement as shown in FIG. 7, the second-stage cell disruptors 50 receive the pre-processed fluid from the rail 48 by means of a pump or may be fed directly from the first-stage cell disruptors. In this regard, the second-stage cell disruptors 50 are capable of further breaking down the fibre particles within the fluid to extract the remaining juice present in the juice-containing cells. The second-stage cell disruptors are typically dynamic rotor-stator homogenisers comprising concentric tool rings that are radially slotted or drilled and operated at speeds typically in the order of 50 m/s, however different speeds may be used depending upon the requirements of the process. In this regard, the fluid passing therethrough is subject to multistage hydrodynamic high-shear forces, high frequency oscillating forces, intensive micro-volume mixing and pressure increases which ensure further breakdown of the fibre present in the fluid and subsequent release of the remaining juice.

The second-stage cell disruptor(s) 50 may be homogenisers which are sold and supplied by Buckau-Wolf Technologie GmbH under the name SUPRATON®.

Whilst the present invention has been described in relation to a two-stage cell disruption process comprising a first and then a second stage cell disrupter, it may be possible that a single step may be applicable, particularly if the particle size of the fibre in the holding tank 30 is of a size that allows a single stage cell disruption step.

Whilst the fluid from the second-stage cell disruptor may be of sufficient quality to collect and send for further refinement and processing off-site, in the depicted embodiment and in order to separate the fibre particles from the juice, the fluid from the second-stage cell disruptor 50 is presented to a separating device 60 in the form of a decanter 60. As shown more clearly in FIGS. 5 and 6, the decanter 60 is in the form of a centrifuge decanter consisting of a bowl chamber 62 and a central screw conveyor 64.

The fluid is fed into the decanter 60 at end 61 of the bowl 62, which rotates thereby generating a centrifugal force in the fluid, causing the fibre particles in the juice to be separated from the juice and be drawn to the edges of the bowl 62. The juice is then removed at the other end of the bowl through a centrally located pipe 66 and removed from the unit 2 for storage or for recirculating back into the storage tank 30. The central screw conveyor 64 acts to remove the build up of the fibre particles from the bowl thereby compressing it and separating fibre and juice, conveying the fibre from end 61 back to the field while the mobile unit 2 is in operation.

Figure 2:
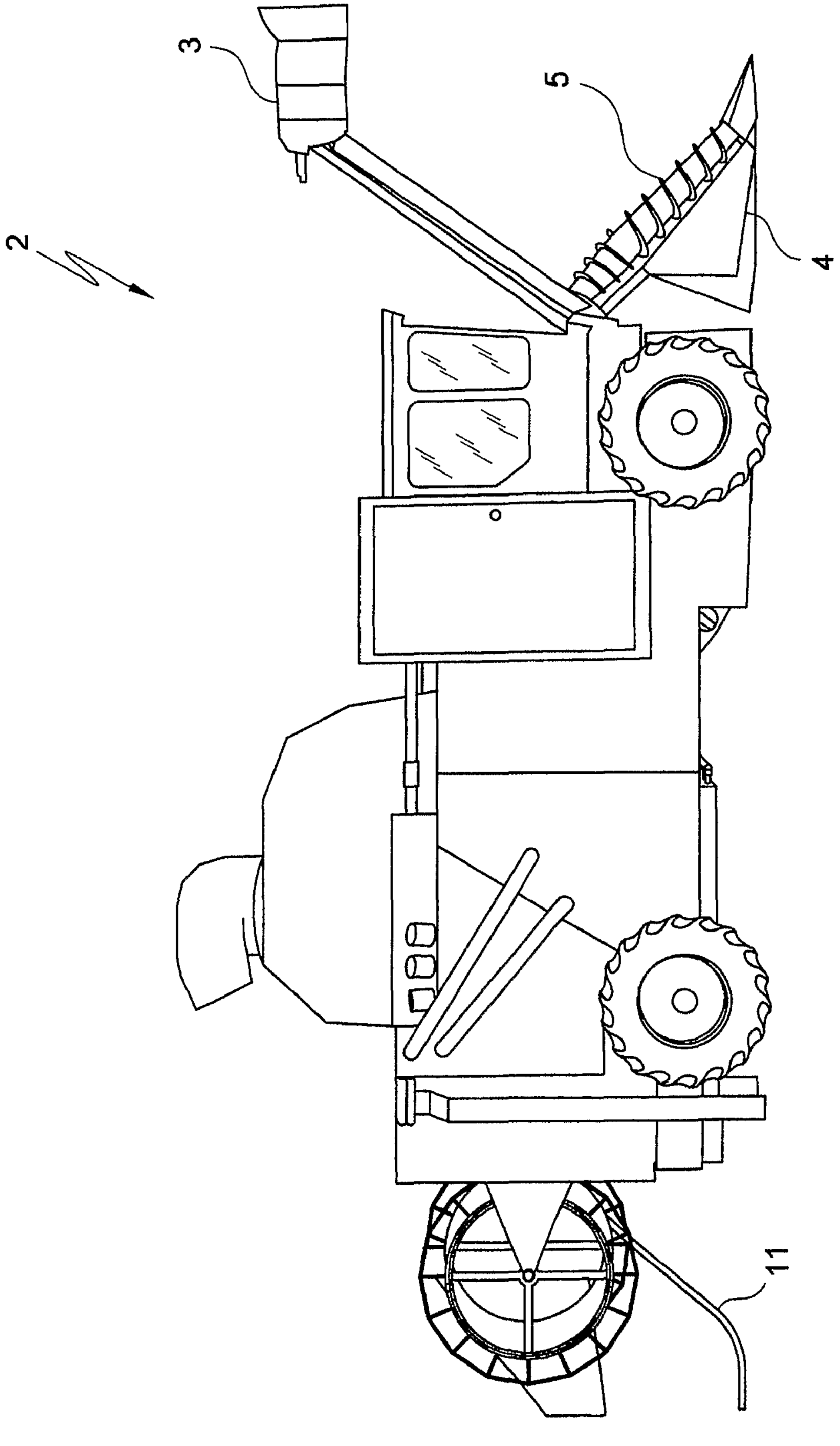
FIG. 2 is a depiction of a biomass processing unit according to one embodiment of the present invention.

As shown more clearly in FIG. 2, a hose 11 is provided at the rear of the unit 2 which is connected to a remote storage tanker to store the juice for transporting to a mill for further processing. It is also envisaged that the unit 2 could be supplied with an onboard tank to store the juice which can then be later supplied to a tanker or other storage and transport vehicle for transporting to a processing mill. In each of these instances, it may be necessary to continually source the extracted juice for recirculating within the process to maintain appropriate fluidity of the system and a desirable fibre content. In this case, a controller and associated pump and piping may be provided to reclaim the stored juice and deliver it back into the tank 30.

The juice taken from the decanter 60 is the product of a number of steps which extract the juice from the juice containing cells of the fibre. These steps are directed towards continually reducing the particle size of the fibre, thereby disrupting the individual cells and facilitating the release of the juice contained therein. It will be appreciated that the process does not necessarily require squeezing, hammering, or other such traditional mechanical extraction processes, but rather addresses the cell structure of the matter to extract the juice directly therefrom. This is achievable by generating a fluid mass whereby the fibre is suspended in fluid, and directing the flow of the fluid to generate shearing forces within the fluid to break down the fibre particles and facilitate the release of the juice into the surrounding fluid. Such a system does not require separating the juice from the fibre as the juice is extracted therefrom, but retains the fluid content of the system to further extract the juice.

The system and process described above, enables a relatively large majority of the processing of the sugar cane to be performed in the field, such that the juice can be readily extracted from the cane for shipment, rather than the billets of cane stalk. Such a system and process potentially reduces the loss of biomass from the field, reduces transport and infrastructure costs for the grower and provides the grower with more diversification opportunities than was previously the case.

The juice extraction process also has the advantage of directly targeting individual cells of the fibre to release the juice contained therein. Further, it also has the advantage of extracting the juice from the fibre at the earliest possible time after harvesting of the biomass.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for extracting juice from a fibrous material containing juice containing cells, the apparatus comprising:

a receptacle configured to contain a fluid therein and receive fibrous material fed into said receptacle;

a processor for combining, in said receptacle, said fibrous material and said fluid into a first fluid mixture, the processor comprising cutting devices having rotary blade cutters in said receptacle configured to cut and shear the fibrous material suspended in said fluid in order to combine said fibrous material and said fluid into said first fluid mixture;

an outlet, comprised in the receptacle, via which at least some of the first fluid mixture can be removed from the receptacle;

at least one cell disruptor device for receiving removed first fluid mixture and facilitating at least partial release of juice from the juice containing cells to form a second fluid mixture; and a storage chamber for receiving and storing at least a portion of the second fluid mixture.

2. An apparatus according to claim 1, wherein the receptacle is a tank that has a quantity of fluid contained therein prior to receiving the fibrous material.

3. An apparatus according to claim 1, wherein the fibrous material comprises juice-containing cells, and the fibrous material is processed prior to being received in the receptacle to at least partially expose and/or rupture the juice-containing cells.

4. An apparatus according to claim 1, further comprising a monitoring device for monitoring the fibre content of the first fluid mixture.

5. An apparatus according to claim 4, further comprising an extractor device for removing fibre content from the first fluid mixture in the event that the fibre content present in the first fluid mixture exceeds a predetermined level.

6. An apparatus according to claim 1, wherein the at least one cell disruptor device is mechanical cell disruptor.

7. An apparatus according to claim 1, wherein the apparatus is part of a mobile unit which is positioned within a field or crop to receive the fibrous material as it is harvested.

8. The apparatus according to claim 1, wherein the cutting devices facilitate the release of juice from juice containing cells of the fibrous material into the fluid to form the first fluid mixture.

9. The apparatus according to claim 5, wherein the volume of the fibre content in the first fluid mixture is maintained at a level of between 5-20% of the volume of the first fluid mixture.

10. The apparatus according to claim 1, wherein the cell disruptor device comprises an inlet, in fluid communication with the outlet of the receptacle, to receive removed first fluid mixture from the receptacle.

11. The apparatus according to claim 10, further comprising a pipe, the fluid communication between the outlet of the receptacle and the inlet of the cell disruptor device being via the pipe.

12. The apparatus according to claim 10, wherein the cell disruptor device draws the first fluid mixture from the receptacle through the inlet, and the cell disruptor device creates a turbulence in the flow of the first fluid mixture as it passes from the inlet and out through an outlet of said cell disruptor device, said turbulence thereby creating shearing forces between the fibrous material present in the first fluid mixture which causes the cellular structure of the fibrous material to at least partially disintegrate such that juice is released therefrom to form the second fluid mixture.

13. The apparatus according to claim 1, wherein the storage chamber is in fluid communication with the receptacle to allow the second fluid mixture to be reintroduced back into the receptacle in the event of the fibre content present in the first fluid mixture exceeding a desired level.

14. The apparatus according to claim 1, further comprising a separating device to separate at least some or all of the juice from the fibrous material present in the second fluid mixture.

15. An apparatus according to claim 1, wherein the at least one cell disruptor device is a rotor-stator homogeniser.

* * * * *